(12) United States Patent
Riddle

(10) Patent No.: US 8,783,660 B1
(45) Date of Patent: Jul. 22, 2014

(54) SELECTIVELY LOCATABLE LIFTING SYSTEM

(76) Inventor: Cliffdan R. Riddle, Cabool, MO (US)

( * ) Notice: Subject to any disclaimer, the term of this patent is extended or adjusted under 35 U.S.C. 154(b) by 93 days.

(21) Appl. No.: 13/595,183

(22) Filed: Aug. 27, 2012

(51) Int. Cl.
*B60S 9/02* (2006.01)

(52) U.S. Cl.
USPC .......................................... 254/418; 254/424

(58) Field of Classification Search
CPC ........... B66F 3/00; B66F 11/00; B60D 1/665; B60D 1/58; B60S 9/00
USPC .................................................. 254/418–427
See application file for complete search history.

(56) References Cited

U.S. PATENT DOCUMENTS

| | | | |
|---|---|---|---|
| 6,361,023 B1 * | 3/2002 | Peavler .......................... | 254/424 |
| 6,607,183 B1 * | 8/2003 | White et al. .................. | 254/420 |
| 7,296,784 B2 * | 11/2007 | Peter ............................. | 254/418 |
| RE43,535 E * | 7/2012 | Roll .............................. | 254/425 |
| 2004/0159827 A1 * | 8/2004 | Drake, III ..................... | 254/425 |
| 2007/0257243 A1 * | 11/2007 | Cofer ............................ | 254/419 |
| 2008/0146397 A1 * | 6/2008 | Drake .......................... | 475/206 |
| 2008/0191183 A1 * | 8/2008 | Rucks ........................... | 254/424 |
| 2009/0057633 A1 * | 3/2009 | Beck et al. .................... | 254/420 |
| 2010/0133783 A1 * | 6/2010 | Walstrom et al. ............. | 280/475 |
| 2011/0073821 A1 * | 3/2011 | Nirenberg .................... | 254/420 |
| 2012/0326106 A1 * | 12/2012 | Murri ............................ | 254/420 |
| 2013/0341579 A1 * | 12/2013 | Beck et al. .................... | 254/420 |

* cited by examiner

*Primary Examiner* — Lee D Wilson

(74) *Attorney, Agent, or Firm* — Dennis B. Haase

(57) ABSTRACT

A selectively positionable lifting system for a utility trailer, or the like, in which a jacking system is selectively attachable to a strategic position of the utility trailer in order to lift said trailer at the jack point for maintenance and repair purposes, the jacking system being easily removed and stowed when not in use.

10 Claims, 4 Drawing Sheets

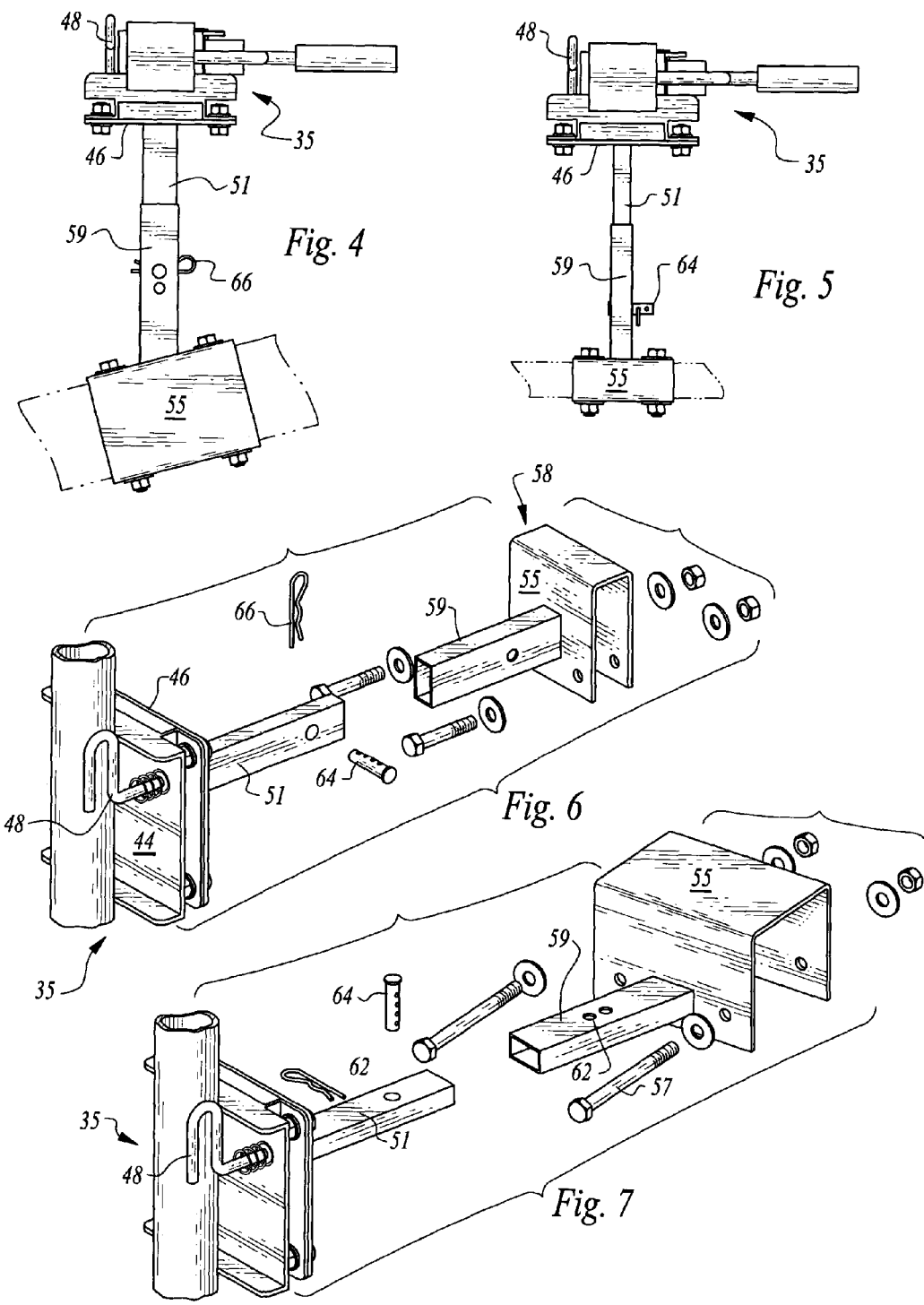

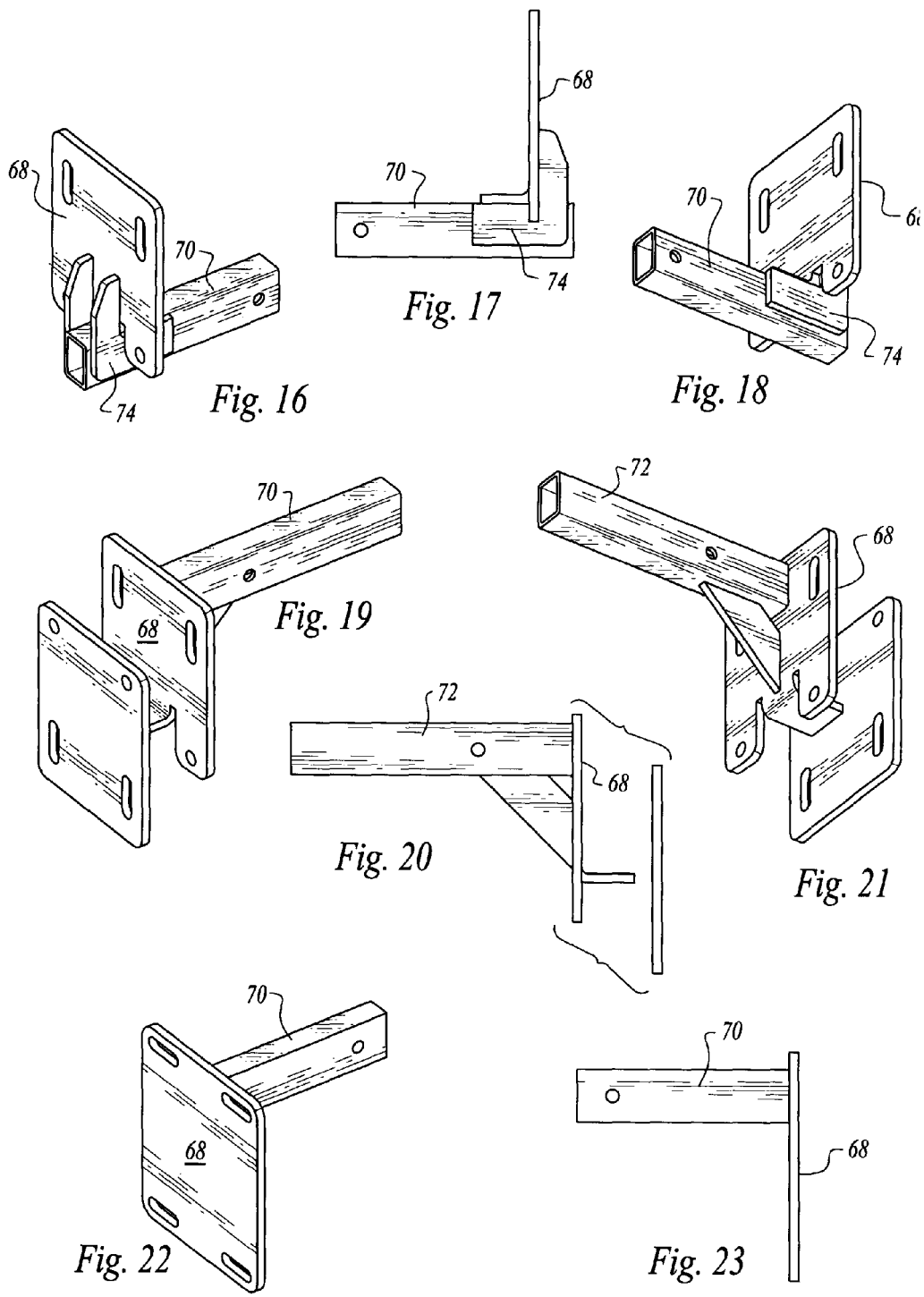

SELECTIVELY LOCATABLE LIFTING SYSTEM

The present invention relates, in the general sense, to a system for raising and lowering of a wagon, trailer, or the like, and, more specifically, to such a system which is portable and positioned for a particular service, or for such other purpose as may, from time to time arise.

BACKGROUND OF THE INVENTION

1. Field of the Invention

Among the myriad tools man has devised to enhance both his work and pleasure is the venerable trailer.

The trailer comes in many forms which may be characterized generally as utility trailers having a bed, at least one axle and a pair of wheels mounted thereon, together with a forward tongue terminating in a hitch mechanism, which is selectively connected to a vehicle to permit towing. In order that the trailer can be towed on today's modern highways and roads, it is typically supported by inflatable tires.

To absolutely nobody's surprise, inflatable tires inevitably become deflated. When deflation occurs, from whatever cause, towing becomes problematic, at best, and, realistically, the person doing the towing should, if not must, pull over and remedy the situation before proceeding further down the road. Failure to do so will almost always result in the tire being chewed up by the rim, thereby exacerbating the entire failure situation.

Except in the rarest of circumstances, a tire change involves locating a jack and raising the tire off the road so that it can be removed and repaired or replaced, as the situation dictates. A person doing the towing may have a jack in the tow vehicle. The question then becomes whether or not the jack will fit under the frame of the trailer sufficiently so as to cause the frame to be raised, with the consequent raising of the wheel sufficiently to permit its removal.

If the jack found is of a scissor type, which will rest on the ground, and if it has a height less than the height of the low point of the trailer adjacent the wheel to be repaired, there would appear to be little problem in effecting a tire repair or change. On the other hand, if the jack is the more typical bumper jack, all sorts of problems may arise and, in fact, that type jack may inhibit, if not totally prevent, the jacking of the trailer.

The focus of the present invention is to address problems such as those articulated above with a straight forward remedy.

2. Overview of the Prior Art

Inexplicably, there appears to be a dearth of prior art efforts to address the problem articulated by this application. One such patent issued to Nudd et al., U.S. Pat. No. 5,067,092. The Nudd et al. jack will be immediately recognized as the jack often found on the tongue of boat trailers to support that tongue at a height sufficient to permit the trailer hitch of a tow vehicle to be readily attached to the tongue of the trailer. The jack itself involves a pair of telescoping tubes with the wheel attached to the tube having the lesser diameter. A crank raises and lowers the inner tube to situate the tongue of the trailer at the appropriate height.

An earlier patent to Adams, U.S. Pat. No. 4,238,313, is similar in structure and concept in that the jack is strapped to an element of the trailer and is vertically situated with a flat plate at the base (40), rather than the wheel found in Nudd.

Both Nudd and Adams are essentially permanent structures in that they are bolted, or otherwise strapped, to a frame element of the trailer to which they are joined. As a consequence, the essentially vertical orientation of the jack itself tends to limit ground clearance and, in general, becomes an impediment which must be worked around. Neither addresses the problem which is the focus of this application.

In yet another effort at providing a jacking device, Schwebke U.S. Pat. No. 4,176,825 raises the complex to an art form by mounting a swing double jack to his trailer rail. With an array of four bar mechanisms, the jack swings from the vertical to a horizontal position just under the rail, where it is out of the way until needed. Again, this is a purely permanent structure adding additional weight to the trailer itself.

SUMMARY OF THE INVENTION

The present invention teaches both method and apparatus for the quick change, or repair, of a utility trailer having an issue in the field, with existing equipment at hand.

It is, therefore, an objective of the present invention to provide a system for maintenance and repair of a utility-type trailer in the field quickly and efficiently.

It is another objective of the present invention to provide a system whereby at least a portion of a utility trailer can be lifted sufficiently so as to permit maintenance and/or repair on a wheel, or other trailer element, with existing equipment readily at hand.

It is a further objective, consonant with the foregoing, to provide a system that will permit lifting of any portion of a trailer for maintenance and repair purposes in an economic and convenient manner.

It is a still further objective of the present invention to provide a system whereby a jacking system can be easily and conveniently stowed out of the way on a utility trailer, or a tow vehicle, and pressed into service with a minimum effort or loss of time when needed.

The foregoing objectives and benefits of the present invention will become apparent from a reading of the Detailed Description of A Preferred Embodiment, taken in conjunction with the drawings, wherein:

DESCRIPTION OF THE DRAWINGS

FIG. 4 is a top plan view of a lifting system constructed in accordance with the present invention and attached to a side rail of a trailer, such as that the depicted in FIG. 1;

FIG. 5 is a top plan view in the nature of FIG. 4, showing as it would appear in the FIG. 2 embodiment;

FIG. 6 is an exploded view of a connective apparatus for the lift system shown in FIG. 2;

FIG. 7 is an exploded view of a connective apparatus for the lift system shown in FIG. 3;

FIG. 16 is a perspective view of that alternative trailer tongue bracket in which the receptacle is located at the base of the mounting plate;

FIG. 17 is an end view of the mounting bracket of FIG. 16;

FIG. 18 is a second perspective view in the vein of FIG. 16, but reversed;

FIG. 19 is a perspective view of a wheel mounting bracket primarily for a boat trailer;

FIG. 20, is an end view of the bracket of FIG. 19;

FIG. 21 is a view, in perspective, of the bracket assembly of FIG. 19, but taken from the opposite direction;

FIG. 22, it is a mounting bracket similar to that shown in FIG. 12, but with the receptacle moved to the top of the mounting plate; and, FIG. 23, is an end view of the bracket of FIG. 22.

DETAILED DESCRIPTION OF A PREFERRED EMBODIMENT

Figure 1:
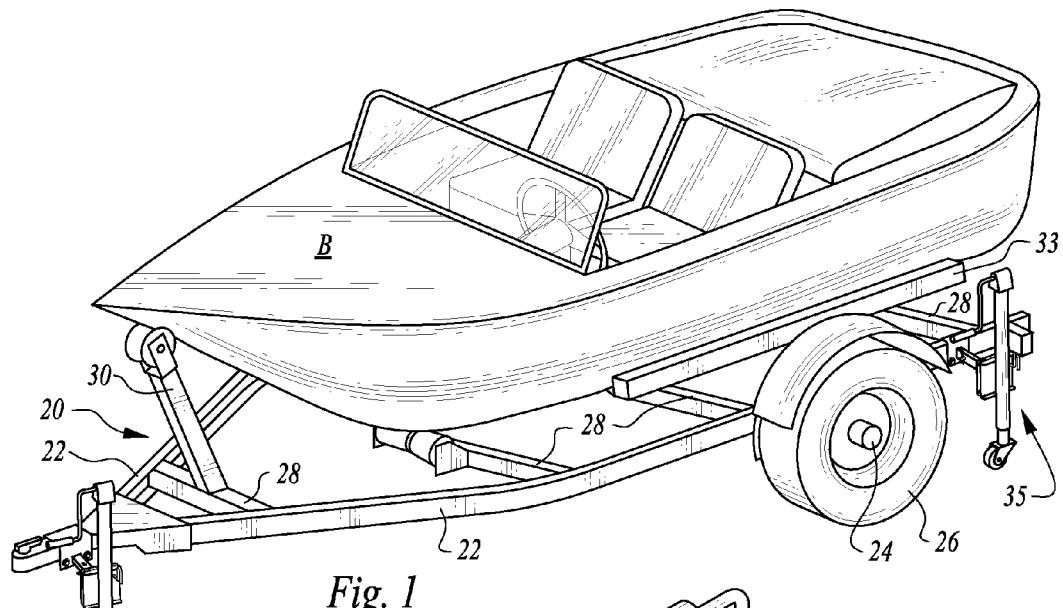
FIG. 1 is a pictorial representation of a typical light trailer, in this particular instance, a boat trailer, upon which a lifting system of the present invention has been installed.

With reference to the drawings and, initially, to FIG. 1, the environment in which the present invention has particular, although not exclusive, utility, is illustrated.

Accordingly, a boat B is in repose on a trailer 20. The trailer is typical of utility trailers used for the transport of water craft such as the boat B. Utility trailers, while being built for a specific purpose, have many features in common. Most, if not all, have the framework, including side rails, and terminate in a tongue, having a hitch of any well known design.

In the FIG. 1 example, side rails 22 are supported by at least one axle 24 and supporting wheels 26. Cross members 28 provide strength and rigidity as needed. The basic framework just referenced provides a foundation to create whatever configuration is necessary, depending upon the purpose for which the utility trailer 20 is intended in FIG. 1. In order to support a boat, a forward bow support 31 is mounted to a cross member 28 and side buffers 33 add additional support, particularly against side forces that may be created by turns during transportation.

A central purpose of the present invention is to create a system whereby a utility trailer, such as that shown in FIG. 1, may be raised, or lifted, to effect maintenance and/or repairs of a wheel, or the like, when needed and with a minimum loss of time and effort. Typical among the types of repairs experienced by trailers is a flat tire.

In the current state of the art, the driver of the vehicle hauling the utility trailer, upon experiencing a problem, will attempt to find a flat spot along the road before stopping. The driver will then pull out his scissor jack (presuming one is available), or some other device, and impress it on a frame rail 22 of the trailer in order that the problem tire 26 can be raised sufficiently to permit its repair or replacement.

For myriad reasons, ranging from neglect to unavailable ability, an appropriate device may not be available and, if it is available, may be difficult to effectively cause lifting of the utility trailer. By way of example, if only a bumper jack is available, it may just be difficult, if not impossible, to effectively engage a side rail or some other structural element of the utility trailer to effect the lifting necessary. As will become apparent from the further reading of this specification, the lifting device of the present invention virtually eliminates several difficulties which might otherwise be experienced given the current state of the art.

Figure 2:
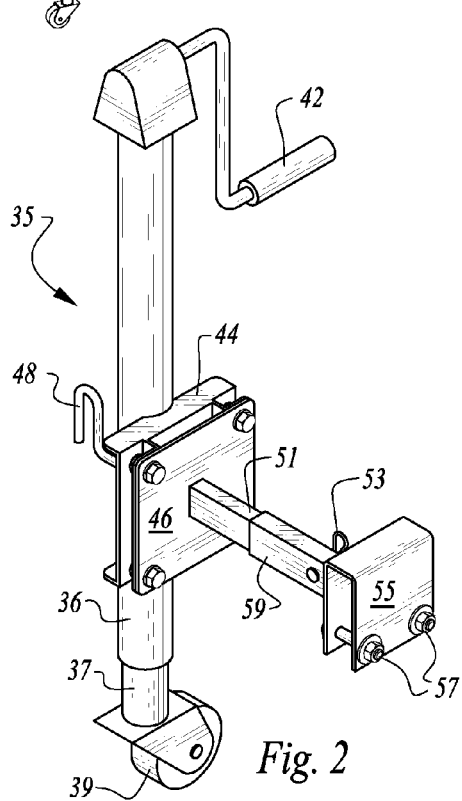
FIG. 2 is a pictorial representation of a lifting system constructed in accordance with the present invention.
Figure 3:
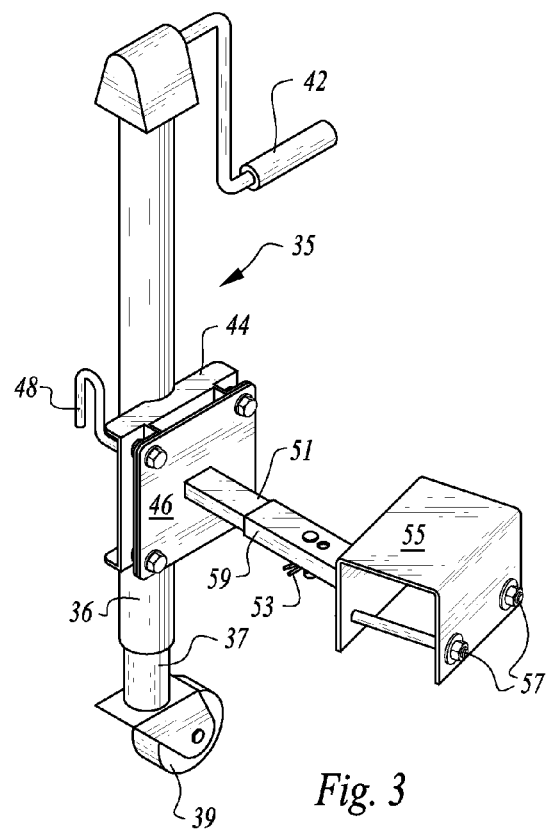
FIG. 3 is a pictorial representation of the lifting system constructed in accordance with the present invention, illustrating a slightly different arrangement for engagement with a trailer such as that shown in FIG. 1.
Figure 8:
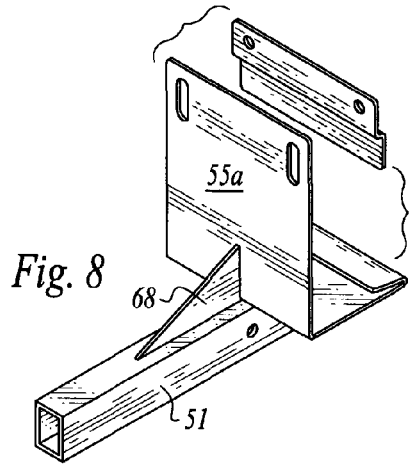
FIG. 8 is a perspective of a rear bracket assembly for use in connecting the lifting system of the present invention to a utility trailer.
Figure 9:
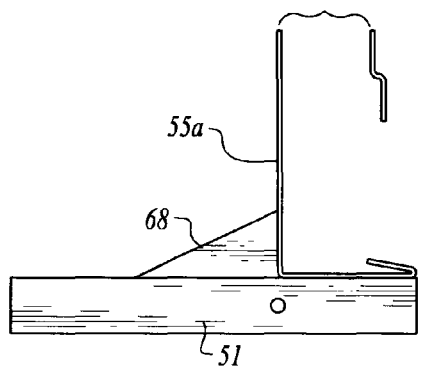
FIG. 9 is a side elevation of the apparatus of FIG. 8.

Moving now to FIGS. 2 and 3, a lifting system 34, including a lifting device, often referred to as a jack, 35, is there illustrated as part of a jack assembly 38. Jack 35 is one of several manually operated lifting devices which are available on the market. Indeed, there are some motorized or other automatic operating lifting devices which might also suffice for the purposes of the present invention. As shown, the jack 35 has a tubular frame 36 with a telescoping member 37 mounted on a caster, or wheel, 39. A hand crank 42 permits the user to extend or retract the tubular member 37. Such lifting devices are rated in terms of the weight which they can accommodate, and one needs to pick the appropriate jack for the use to which it is intended.

The invention, in its totality, does not rest on the design of the jack alone. Rather, it is a system which includes the jack and permits a utility trailer, or the like, to be raised and lowered at any point in its structure quickly, completely and with minimal effort to effect maintenance or repair . . . and when not in use, protruding elements of the system are stowed out of the way.

FIGS. 8 through 23 are illustrative of an important feature of the lifting system of the present invention. That feature is a mounting bracket arrangement by which the jacking, or lifting system, is selectively positioned on the trailer and easily removed and/or stowed out of the way when not in use.

The bracket arrangement comprises several variations on the basic theme, each one of which was created in order to accommodate the idiosyncrasies of at least one of the many utility trailer manufacturers. Specific elements thereof are described hereinafter in terms of their function within the system 34.

Again referring to FIGS. 2 and 3, the lifting system of the present invention is shown in a stand alone configuration. Attached to the jack 35 is a mounting plate 44. The mounting plate is so situated that when the lifting system is in place, engaged with the trailer 20, the crank 42 is away from anything that would obstruct its free rotation by the user to raise and lower the trailer.

Moving next to FIGS. 6 and 7, a support plate 46 engages the mounting plate 44 by means of a quick disconnect arrangement 48, which is one of several well known arrangements, the specifics of which are not illustrated for that reason. The quick disconnect arrangement permits the jack to be rotated out of the way into a horizontal position. The support plate 46 is provided with a tubular extension 59, which is received in the cantilevered connector 51.

Circumstances may arise in which a side rail is angled with respect to the direction of travel of the trailer. Under such circumstances, it may be expedient to set the receptacle and the connector at an angle relative to the rail at its point of curvature in order to obtain optimum lift when the jack is actuated. The cantilevered receptacle 59 is of a rectangular, tubular configuration, as shown, although it will be appreciated by those skilled in the art that any tubular configuration which meets the needs of this element within the invention is within the contemplation thereof.

In order that the lift system can be quickly and easily connected and disconnected to the trailer 20, a companion position bracket 53 is provided. The positioning bracket comprises two essential parts, the first being a trailer connector 55, which may assume various forms, depending upon the structure of the trailer 20 itself. For example, and with reference to FIGS. 1 through 7, where the utility trailer is a boat trailer having side rails 22, a U-shaped trailer connector accomplishes the purpose. The specific width of the trailer connector would depend, quite obviously, on the configuration of the rail 22 itself, and it is possible to have any number of such widths in keeping with the invention.

The trailer connector is removably fixed, as in the case of FIGS. 2 and 3, to the side rail by means of fasteners 57, of well known construction. Protruding outwardly from the trailer connector is a cantilevered connector 51, which is of a tubular configuration and so dimensioned as to slide comfortably into cantilevered receptacle 59, thereby completing the connection between the trailer 20 and the lifting device jack 35.

It will be appreciated by those skilled in the art that the trailer connector can be secured to the side rail of a trailer at any position most suitable to effect the maintenance or repair contemplated by the user. The fasteners 57 can either be permanently affixed or temporarily affixed to the bracket 55 to the trailer rail as the user may choose, but, in any event, the lifting device can be selectively positioned and, obviously, removed when not in use and stowed out of the way. Indeed, multiple brackets 55 can be secured to the trailer, if desired.

To ensure the connection between the cantilevered receptacle 59 and the cantilevered connector 51, holes are drilled in each at 62 and fasteners 64 are inserted in the hole, once the two connectors are assembled and the cotter keys, or similar holding device, 66 are inserted in the fasteners 64 in order to secure the connection.

Figure 10:
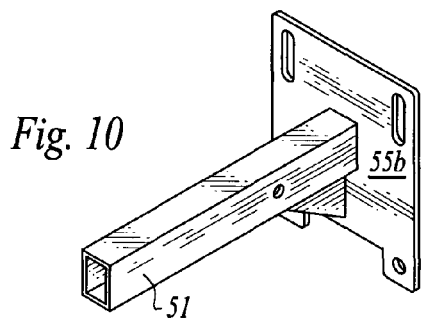
FIG. 10 is a perspective of a rear bracket assembly for use in connecting the lifting system of the present invention to a boat trailer.
Figure 11:
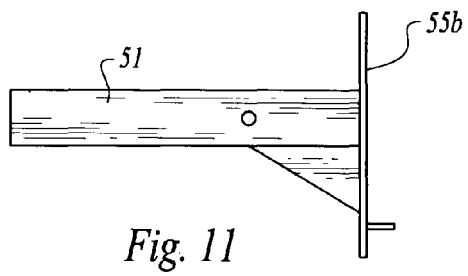
FIG. 11 is a side elevation of the apparatus of FIG. 10.
Figure 12:
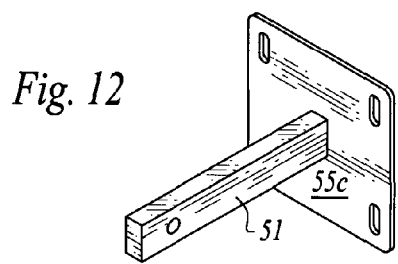
FIG. 12 is a perspective of an attachment apparatus usable for both boat and utility trailers.
Figure 13:
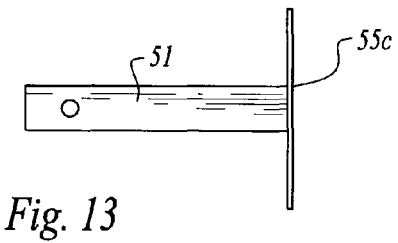
FIG. 13 is a side elevation of the apparatus of FIG. 12.
Figure 14:
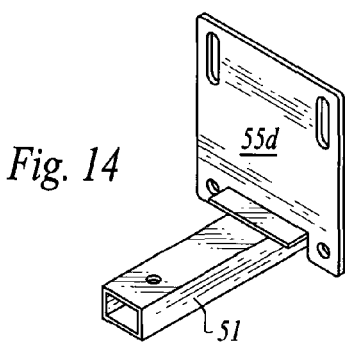
FIG. 14 is a perspective of a tongue-type bracket usable for both a boat and utility trailer.
Figure 15:
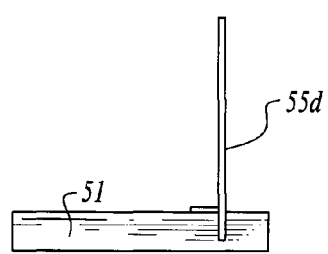
FIG. 15 is a side elevation of the apparatus of FIG. 14.

Returning now to FIGS. 8 through 15, it will be understood by those skilled in the art, that all utility trailers are not identical in construction and many may not have exposed side rails 22, as does the boat trailer of FIG. 1. In order to accommodate various trailer configurations, exemplary trailer connectors are shown in FIGS. 8 through 15, comprising various configurations such as, for example, one having a strengthening gusset 68 in FIG. 8. Others have different configurations of cantilevered connectors, and the plates which are connected to the trailer itself may assume various forms, depending upon what is available by virtue of the construction of the trailer itself. Again referring to FIG. 8, a bracket 55a has been found to be useful with utility trailers. FIG. 10 illustrates a bracket 55b, which is particularly useful with FIG. 12, which shows a simple bracket 55c, which is useful in both utility jack arrangements, and FIG. 14 is very serviceable with bracket 55d mounted to the tongue of any trailer.

The bracket arrangements shown in FIGS. 16 through 23 are variations on the same theme. A mounting plate 68 supports either a cantilevered receptacle 70 or cantilevered connector 72, which is located at the base of the mounting plate 68 as seen in FIGS. 16 through 18. Supports 74 add strength to the arrangement where needed. By positioning the receptacle and connector at the base of the bracket, a modest height adjustment is available, again where needed.

In FIGS. 19 through 23, receptacle and the connector are at the top of the bracket. This is particularly significant where, for example, a wheel or tire goes flat and the frame of the utility trailer is too low to otherwise connect the jack. This modest change in height of the bracket arrangement permits the jack to be connected and function, whereas it might not have otherwise been able to do so.

In operation it will be seen that this system 34 provides all of the benefits attributable to it. A position bracket 53 is affixed to the trailer 20 at the most advantageous position relative to anticipated problems which might be expected to occur. For example, a position bracket 53 may be positioned near one of the wheels, or indeed, near each of the wheels, in anticipation of a potential flat, or other problem with the trailer wheels. Alternatively, of course, a single position bracket 53 can be secured and move from place to place as needed if only one such bracket is available.

When an incident, for example a flat tire, occurs, the tow vehicle and the trailer are first parked out of traffic lanes and on a relatively flat surface, if available. The jack assembly is then retrieved from its stowage and the cantilevered connector 51 is slipped onto the cantilevered receptacle 59, and the two connectors engaged with a suitable fastener 64. Where appropriate, a cotter key 66 is passed through the fastener 64 to hold it in position.

Having accomplished that series of actions, the jack 35 is moved against the surface upon which the trailer is parked by lowering the tube 37 until the wheel is off the ground and can be changed, or maintained, as the case may be.

Yet another feature of the present invention involves the presence of a quick disconnect arrangement 48. That arrangement permits the user to separate the jack assembly from the trailer connectors in order that it can be stowed quickly and easily when not in use.

It will be appreciated by those skilled in the art that minor changes and modifications to the specific structure of the present invention are within the contemplation of the invention and are possible. It will also be appreciated that such minor modifications are well within the contemplation of the invention, as defined by the following claims, wherein:

The invention claimed is:

1. A selectively positionable lift system for utility trailers, the trailer having a frame, a tongue extending outwardly from the frame and supporting wheels, comprising
   a jacking system, said system including a jack, a mounting plate secured to said jack, a supporting plate releasably connected to said mounting plate, said support plate having a cantilevered receptacle protruding therefrom;
   a connector bracket engageable with the utility trailer; said connector bracket having a cantilevered connector protruding therefrom, said cantilevered connector adapted to be received in said cantilevered receptacle to thereby selectively engage said jacking system with said utility trailer at a point along said side rail to permit at least a portion of said trailer to be lifted for the purpose of maintenance or repair.

2. The lift system for utility trailers of claim 1, wherein said cantilevered receptacle and said cantilevered connector are formed of rectangular tubing.

3. The lift system for utility trailers of claim 1, wherein said cantilevered receptacle and said cantilevered connector extend outwardly from the lower portion of said mounting plate and said connector bracket respectively.

4. The lift system for utility trailers of claim 1, wherein said supporting plate and said mounting plate are interconnected, said interconnection being a quick disconnect arrangement, whereby said jack is selectively rotatable between a vertical position and a horizontal position.

5. The lift system for utility trailers of claim 1, wherein said utility trailer includes at least two wheels; said connector bracket being engaged with said utility trailer adjacent at least one of said wheels at a time.

6. The lift system for utility trailers of claim 1, wherein said utility trailer includes at least two wheels; a said connector bracket being disposed adjacent each wheel of said utility trailer.

7. The lift system for utility trailers of claim 1, wherein said utility trailer including a tongue, said tongue being attachable to a tow vehicle; said connector bracket being attachable to said tongue.

8. The lift system for utility trailers of claim 3, wherein apertures being formed respectively in said cantilevered receptacle and said cantilevered connector, said apertures being aligned when said cantilevered connector is inserted in said cantilevered receptacle; a fastener inserted in said aligned apertures to hold said cantilevered receptacle and said cantilevered connector together.

9. The lift system for utility trailers of claim 3, wherein said utility trailer includes at least two wheels; a said connector bracket being disposed adjacent each wheel of said utility trailer.

10. The lift system for utility trailers of claim 1, wherein said cantilevered receptacle and said cantilevered connector extend outwardly from the upper portion of said mounting plate and said connector bracket respectively.

\* \* \* \* \*